(12) United States Patent
Barth

(10) Patent No.: US 7,178,420 B2
(45) Date of Patent: Feb. 20, 2007

(54) RING GEAR

(75) Inventor: Walter Barth, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 543 days.

(21) Appl. No.: 10/333,548

(22) PCT Filed: May 7, 2002

(86) PCT No.: PCT/DE02/01636

§ 371 (c)(1),
(2), (4) Date: Aug. 15, 2003

(87) PCT Pub. No.: WO02/095265

PCT Pub. Date: Nov. 28, 2002

(65) Prior Publication Data

US 2004/0025346 A1 Feb. 12, 2004

(30) Foreign Application Priority Data

May 23, 2001 (DE) ................. 101 25 067

(51) Int. Cl.
*F16H 55/17* (2006.01)
(52) U.S. Cl. ...................... 74/459.5; 74/460
(58) Field of Classification Search .............. 74/457, 74/459.5, 460
See application file for complete search history.

(56) References Cited

U.S. PATENT DOCUMENTS 2,403,492 A    7/1946   Boor
2,994,230 A    8/1961   Haberland et al.
3,345,883 A   10/1967   Leo
3,499,367 A    3/1970   Glocker
3,524,361 A *  8/1970   Iyoi et al. ................. 74/417
3,946,620 A *  3/1976   Yamamoto et al. ........ 74/462
4,714,387 A   12/1987   Ohno
4,754,661 A *  7/1988   Barnett ..................... 74/459.5
5,454,702 A * 10/1995   Weidhass ................ 418/206.5
5,490,071 A    2/1996   Akabane
5,695,425 A * 12/1997   Hashimoto et al. ....... 475/180
6,208,101 B1   3/2001   Seeberger et al.
6,991,522 B2 * 1/2006   Yanagimoto et al. ...... 451/47

FOREIGN PATENT DOCUMENTS

| CN | 85 1 08223    | 6/1986  |
| DE | 1 447 354     | 10/1968 |
| DE | 44 21 592 A1  | 1/1995  |
| DE | 195 44 573 C  | 9/1996  |
| DE | 198 28 203 C2 | 1/1998  |
| EP | 0 421 106 A   | 4/1991  |
| EP | 1 023 960 A   | 8/2000  |
| GB | 282 784 A     | 6/1929  |

* cited by examiner

Primary Examiner—David M. Fenstermacher
(74) Attorney, Agent, or Firm—Michael J. Striker

(57) ABSTRACT

A ring gear includes teeth (10) and tooth gaps (12), in which the teeth (10) can be brought vie tooth flanks (14) into engagement with a corresponding pinion. The tooth flanks (14), after a final engagement point (16) of the pinion, from the tooth head (18) toward the tooth base (20), compared to standard tooth flanks (22), are made to approximate a trochoid (24, 26), described by the pinion and projected into a normal section.

5 Claims, 4 Drawing Sheets

RING GEAR

CROSS-REFERENCE

The invention described and claimed hereinbelow is also described in PCT/DE 02/01636, filed on May 7, 2002 and DE 101 25 067.3, filed May 23, 2001. This German Patent Application, whose subject matter is incorporated here by reference, provides the basis for a claim of priority of invention under 35 U.S.C. 119 (a)–(d).

BACKGROUND OF THE INVENTION

The invention is based in particular on a ring gear.

In principle, the goal is to furnish ring gears and pinions that correspond with the ring gears that assure a long service life and quiet meshing.

In production, the goal is to replace metal-cutting production methods that as a rule are cost-intensive, with economical noncutting production methods, and sintering gains high significance.

A stamping tool that can be used for sintering has a negative form of a set of teeth of the ring gear or pinion, as applicable, to be made, and is advantageously produced with an electrode.

Suitable electrodes are typically produced in a rolling process on a bevel-gear toothing, or are wire-eroded in a numerical copying process. In wire erosion, an arbitrary design for rounding out of the tooth base is possible. However, longitudinally cambered tooth flanks cannot be created by this process.

In typical rolling methods, such as by means of milling or planing, longitudinally cambered tooth flanks can indeed be produced, but limits are placed on the design of the rounding of the tooth base. Since a tooth gap in the longitudinal direction normally tapers radially inward or from a so-called heel to a so-called toe of a tooth, this process uses separate tools for each of opposed tooth flanks in a tooth gap, and these tools are positioned against one another at a suitable tooth gap angle. Over the length of the tapering tooth gap, the tools have a constant profile. If an excessively long radius of the tool, or of bits of the tool, is selected for producing the tooth base rounding, then the tooth gap is cut apart in the region of the toe.

SUMMARY OF THE INVENTION

The invention is based on a ring gear with teeth and tooth gaps, in which the teeth can be brought into engagement with a corresponding pinion via tooth flanks.

It is proposed that the tooth flanks, after a final engagement point of the pinion, from the tooth head toward the tooth base, compared to standard tooth flanks, are made to approximate a trochoid, described by the pinion and projected into a normal section. By this means, lever arms by way of which forces act on the teeth can be shortened; at a cross section of the tooth that is at risk of breakage, a long radius can be attained, thus increasing the load-bearing capacity and lengthening the service life. The term "standard tooth flanks" should be understood to mean flanks of a ring gear that correspond to involute flanks.

If the ring gear is produced by a sintering process, then economical large-scale mass production can be assured.

In a further feature of the invention, it is proposed that the tooth gaps in the region of the tooth base are embodied as tapering to a point in cross section, and in particular are embodied in the form of a pointed arch. The invention is based on the recognition that in conventional pressing operations in a sintering process, a far lower compression ratio is attained in the teeth, because of a remaining total height, than in the region of the tooth base. In addition, clumping of a sintering powder that occurs during the pressing first in the region of the higher compression, that is, in the region of the tooth base, prevents an "afterflow" of the sintering powder into the tooth cross section. With the embodiment according to the invention, a powder backup in the region of the tooth base can at least be extensively averted; an advantageous afterflow of sintering powder into the tooth and a uniform density in the region of the tooth base and in the tooth can be attained, and as a result the power density can be increased and the service life can be lengthened. Tooth gaps that taper to a point are understood also to mean tooth gaps that are embodied in obtuse fashion or that have a tip with a radius; the obtuse face forming the tip can have a width of up to about one-fourth of a module, or the radius can be up to about one-fourth of a module.

If the tooth flanks are embodied with a longitudinal camber, then high weight-bearing and quiet rolling can be attained.

Stamping tools for producing the ring gear advantageously have an essentially equivalent negative form, and electrodes for producing the stamping tool have a form essentially equivalent to the ring gear.

To achieve a stamping tool with a desired shape, a standard stamping tool or a standard electrode can be adapted accordingly in a postmachining process.

Especially advantageously, however, the stamping tool and in particular the electrode, or its teeth and tooth gaps, are produced by path-controlled profile cutting, specifically with a CNC-controlled milling machine with a C axis. Milling machines of this kind can be obtained economically and are widely available. Degrees of freedom can be achieved compared with conventional methods in terms of designing the tooth flanks and the tooth base. With a suitable milling cutter, in particular a tooth profile milling cutter, that has milling teeth that are embodied as pointed toward their tooth head and advantageously as tapering in the form of a pointed arch, tooth flanks embodied as tapering to a point according to the invention and at the same longitudinally cambered tooth flanks can be achieved.

An advantageous longitudinal camber can be realized in a simple way by moving a milling head along a convexly curved path to produce a convexly curved tooth base.

Because of the CNC control, high precision and replicability can be achieved, so that it is possible to produce stamping tools and electrodes with high-precision teeth. The CNC milling machine is also simple and fast to adjust, compared to a bevel-gear rolling-milling machine or bevel-gear planing machine.

BRIEF DESCRIPTION OF THE DRAWINGS

Further advantages will become apparent from the ensuing drawing description. In the drawing, exemplary embodiments of the invention are shown. The drawing, description and claims include numerous characteristics in combination. One skilled in the art will expediently consider the characteristics individually as well and put them together to make useful further combinations.

Shown are.

DETAILED DESCRIPTION OF THE PREFERRED EMBODIMENTS

Figure 1:
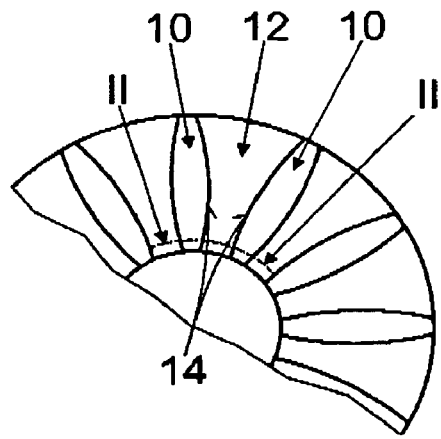
FIG. 1, a detail of a schematic plan view of a ring gear.

FIG. 1 shows a detail of a schematic plan view of a ring gear of the invention, with teeth 10 and tooth gaps 12; the teeth 10 can be brought into engagement with a corresponding pinion, not shown in detail here, by way of tooth flanks 14.

Figure 2:
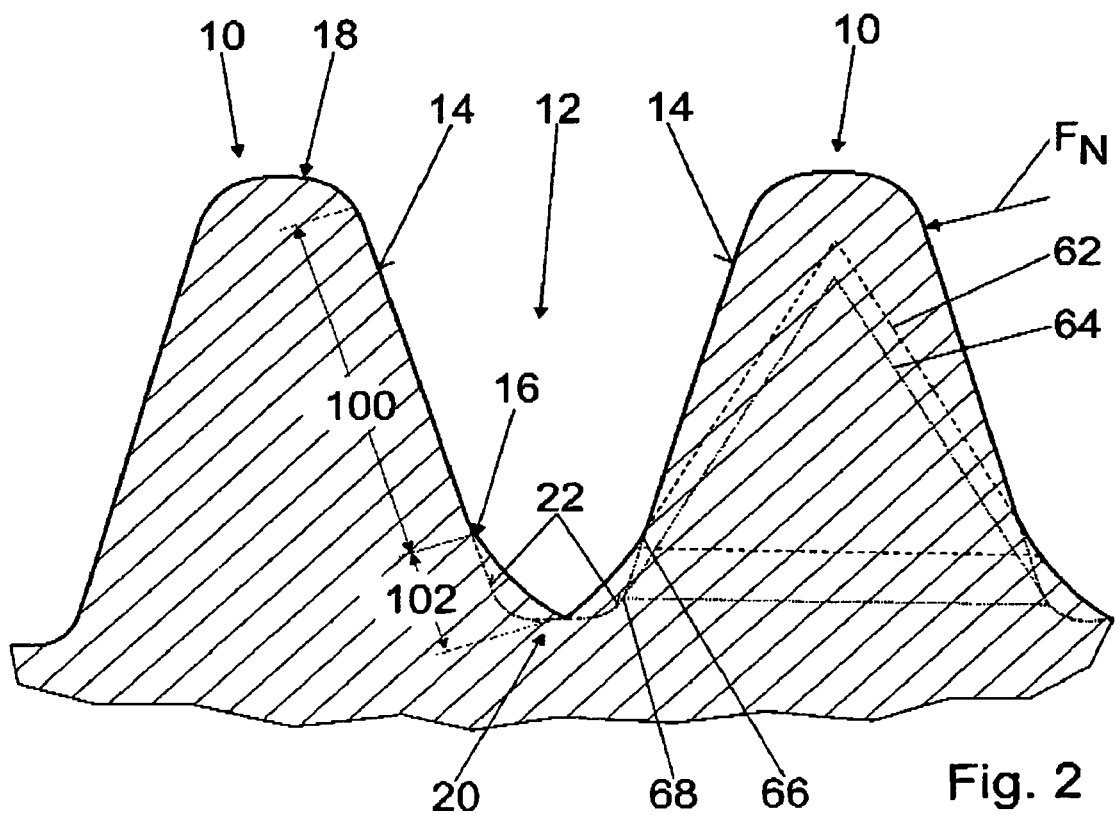
FIG. 2, a section taken along the line II-II in FIG. 1, on a larger scale.
Figure 3:
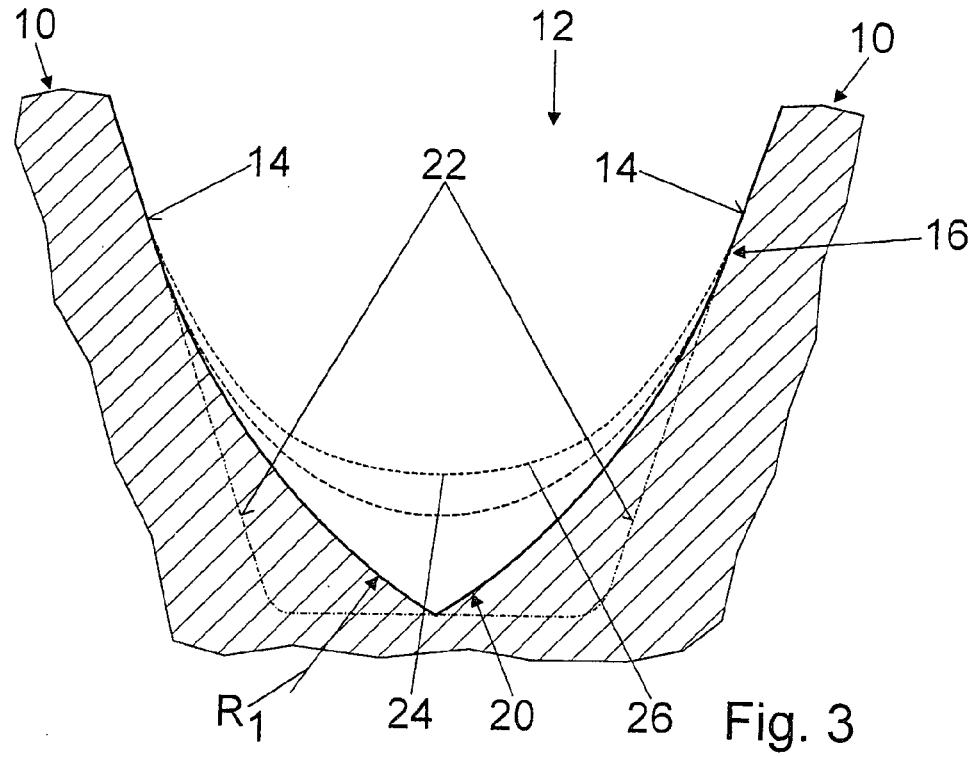
FIG. 3, an enlarged detail of a tooth gap of FIG. 2, with a trochoid described by a pinion and projected into a normal section.

The tooth flanks 14, after a final engagement point 16 of the pinion, from the tooth head 18 toward the tooth base 20, compared to standard tooth flanks 22, are made to approximate a trochoid 24, 26, described by the pinion and projected into a normal section; specifically, the tooth gap 12 is embodied in the form of a pointed arch in cross section in the region of the tooth base 20 (FIGS. 2 and 3).

The trochoid 24 is described by a pinion with a rated tooth height, and the trochoid 26 is described by a pinion with a rated tooth height plus 0.1 mm. The tooth flanks 14, after the last engagement point 16 in the direction of the tooth base 20, have a radius $R_1$ of approximately 1.6 mm and before the engagement point 16 from the tooth head 18 in the direction of the tooth base 20, or in an active partial region, are advantageously embodied as rectilinear. The tooth flanks 14 are embodied with a longitudinal camber, as shown in exaggerated form in FIG. 1.

In FIG. 2, two triangles 62, 64 for strength calculation are shown in one of the two teeth 10 shown; the triangle 62 is associated with the ring gear of the invention, and the triangle 64 is associated with a standard ring gear with standard tooth flanks 22. The triangles 62, 64 have legs that form 30° tangents at points 66, 68 of the tooth 10 that are at risk of breakage. The point 66 associated with the ring gear of the invention is disposed closer to the tooth head 18 than the point 68 associated with the standard ring gear, and as a result, a standard force $F_N$ acting on the tooth 10 can act upon this point 66 with a short lever arm than upon the point 68. Moreover, by means of the provision according to the invention, an advantageously longer radius is attained at the point 66 compared to the point 68.

Figure 4:
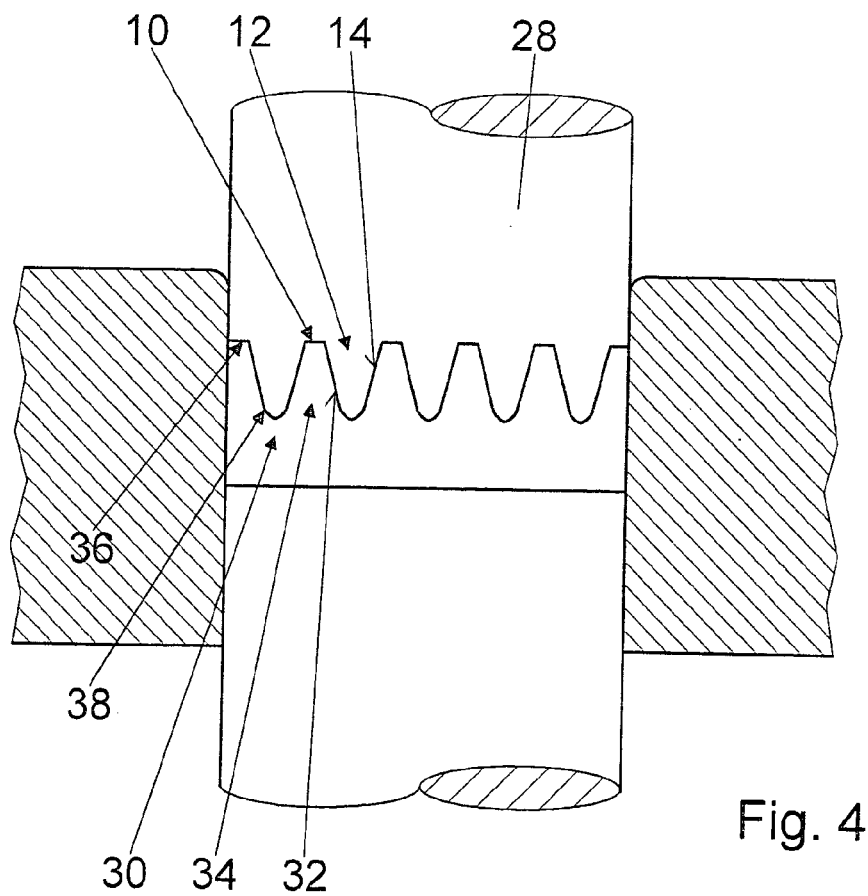
FIG. 4, the ring gear of FIG. 1 in a side view, in a pressing operation.
Figure 5:
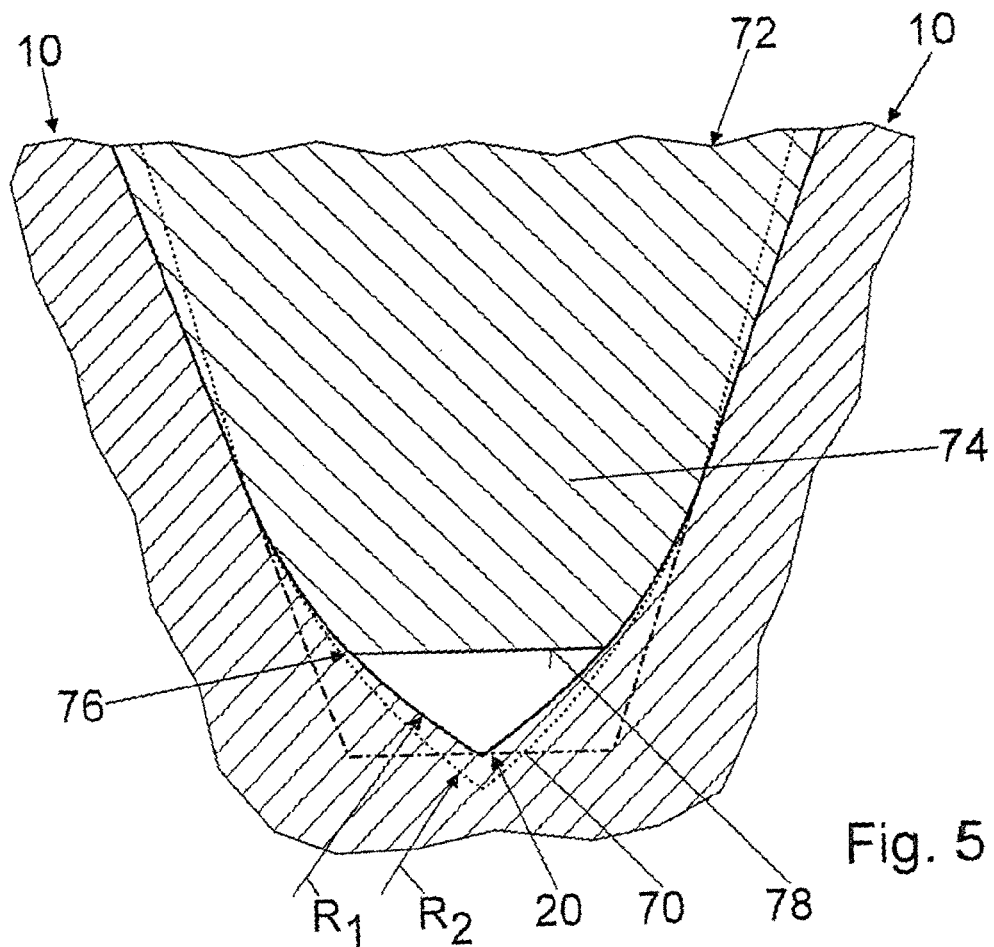
FIG. 5, an enlarged detail of a tooth gap in a post-pressing operation.

The ring gear is produced by a sintering process, in which it is first prepressed (FIG. 4) with a stamping tool 28 with teeth 30, whose tooth flanks 32 define tooth gaps 34. The stamping tool 28 has a negative form essentially equivalent to the ring gear; specifically, the tooth flanks 32, after a point that is associated with the last engagement point 16, from the tooth base 36 in the direction of the tooth head 38 are made to approximate a trochoid, unlike standard tooth flanks. The teeth 30 are embodied in the form of a pointed arch in cross section in the region of the tooth head 38. The stamping tool 28 advantageously has slightly longer teeth 30 than the ring gear, in the exemplary embodiment shown by approximately 0.1 mm, as represented in FIG. 5 with the contour marked 70 of the stamping tool 28. The stamping tool 28 has a radius $R_2$ of approximately 2 mm in the region of its tooth heads 38.

After prepressing with the stamping tool 28, the ring gear is post-pressed with a post-pressing die 72, whose teeth 74 are embodied without a tip or are embodied in obtuse form at the tooth head 76 with an obtuse face 78. A further density compensation and an especially advantageous microstructure can be achieved with the post-pressing.

Figure 6:
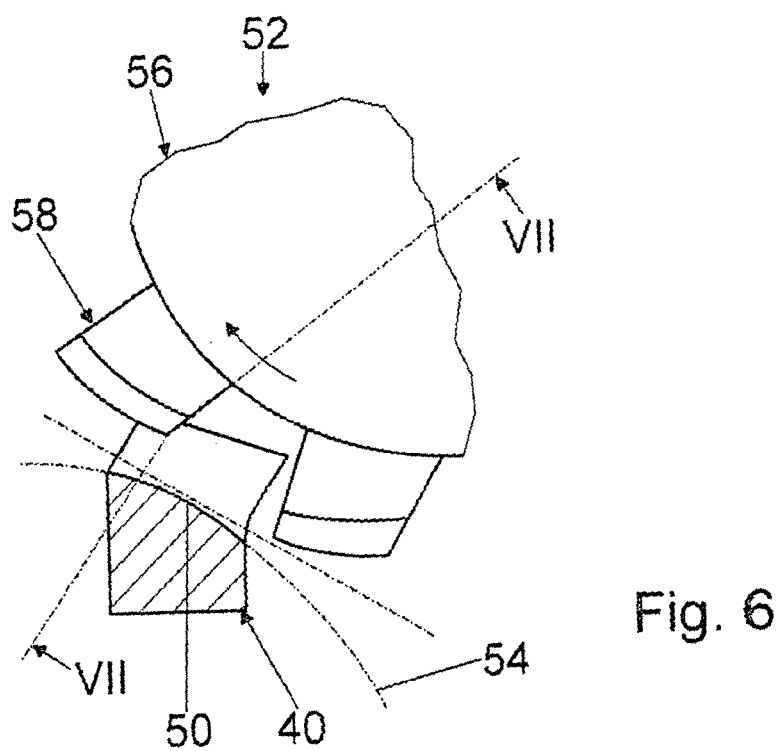
FIG. 6, a detail of a milling head with a tooth profile milling cutter in the production of an electrode.
Figure 7:
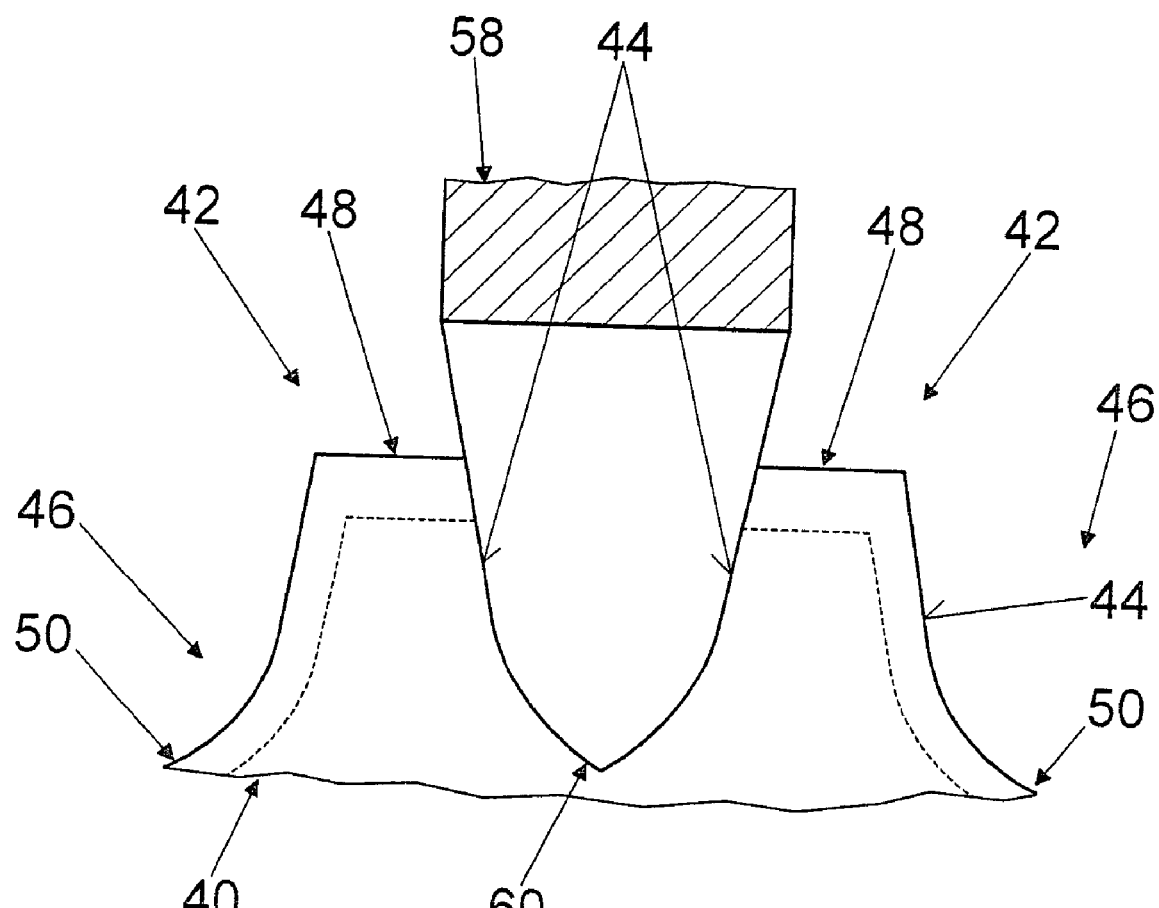
FIG. 7, a section taken along the line VII-VII in FIG. 6.

The stamping tool 28 is produced with an electrode 40 with teeth 42 whose tooth flanks 44 define tooth gaps 46 and which has a negative form of the stamping tool 28, or a form essentially corresponding to the ring gear (FIGS. 6 and 7). The tooth flanks 44, after a point which is associated with the final engagement point 16, from the tooth head 48 toward the tooth base 50, compared to standard tooth flanks, are made to approximate a trochoid in cross section. The tooth gaps 46 are embodied in cross section in the form of a pointed arch in the region of the tooth base 50.

The electrode 40, that is, its teeth 42 and tooth gaps 46, are produced by a path-controlled profile cutting in a milling process, specifically with a CNC-controlled milling machine with a C axis. A tooth profile milling cutter is used, whose milling teeth 58 are embodied as tapering to a point toward its tooth head 60, or in the form of a pointed arch.

A milling head 52 or the tooth profile milling cutter 56 works its way through the electrode 40 over a path 54 along a root cone of the electrode 40, on which a convex curvature is superimposed. As a result of the curvature, a longitudinal camber of the tooth flanks 44 is created. The root cone, compared to a conventional root cone of a proportional ring gear, is inclined in such a way that compared to a proportional tooth, a greater tooth height is present at the heel and a lesser tooth height is present at the toe. Because of this inclination, a requisite tapering of the tooth gap 46 in the partial conical plane is attained. After a tooth gap 46 has been completed, onward indexing is done at the C axis, and the next tooth gap 46 is milled, until all the teeth 42 have been completed.

Like the ring gear, the tooth flanks 44 are embodied rectilinearly in a region associated with the active partial region; as a result, coordinates and normals of a plurality of flank points can be calculated in a simple way and the teeth can be checked using a coordinate measuring instrument, without requiring a special bevel gear measuring technique for the purpose.

Electrodes for the pinion are furthermore advantageously produced by a rolling process. In the rolling process, a tool used is essentially equivalent to the ring gear of the invention, or a tooth of the tool is essentially equivalent to a tooth of the ring gear. The tool tooth travels along a path through the pinion that is essentially equivalent to a path of a ring gear tooth during operation of a bevel gear with the ring gear and the pinion. The path of the tool teeth, however, has a concave curvature in the flank direction, for creating longitudinally cambered pinion flanks.

LIST OF REFERENCE NUMERALS

10 Tooth
12 Tooth gap
14 Tooth flank
16 Engagement point
18 Tooth head
20 Tooth base
22 Standard tooth flank
24 Trochoid
26 Trochoid
28 Stamping tool
30 Tooth
32 Tooth gap
34 Tooth flank
36 Tooth base 38 Tooth head
40 Electrode
42 Tooth
44 Tooth gap
46 Tooth flank
48 Tooth head
50 Tooth base
54 Path
56 Milling cutter
58 Milling tooth
60 Tooth head
62 Triangle
64 Triangle
66 Point
68 Point
70 Contour
72 Post-pressing die
74 Tooth
76 Tooth head
78 Obtuse face
$R_1$ Radius
$R_2$ Radius
$F_N$ Standard force

The invention claimed is:

1. A ring gear with teeth (10) and tooth gaps (12), in which the teeth (10) can be brought into engagement with a corresponding pinion via tooth flanks (14), wherein each of said tooth flanks has a first part that corresponds to involute flanks and a second part located after a final engagement point of the pinion, as viewed in a direction from a tooth head toward a tooth base, wherein the second part corresponds to non-involute flanks and compared to involute flanks of standard tooth flanks approximate an orbit of the pinion, wherein the orbit is determined by the first part of the tooth flanks and forms a trochoid when the orbit is projected in a normal section.

2. The ring gear of claim 1, wherein it is produced in a sintering process.

3. The ring gear of claim 1, wherein the tooth flanks viewed in cross section show a pointed design in the region of the tooth base (20).

4. The ring gear of claim 3, wherein the tooth flanks meet in the tooth base and when viewed in cross section, have a shape of a pointed arch in the region of the tooth base.

5. The ring gear of claim 1, wherein the tooth flanks (14), as viewed in a radial direction from an outside to an inside of the ring gear, have a convex shape in a longitudinal direction.

* * * * *